Feb. 12, 1935.  E. H. GREIBACH  1,990,782
ELECTRICAL MEASURING SYSTEM
Filed Nov. 3, 1932  2 Sheets-Sheet 1
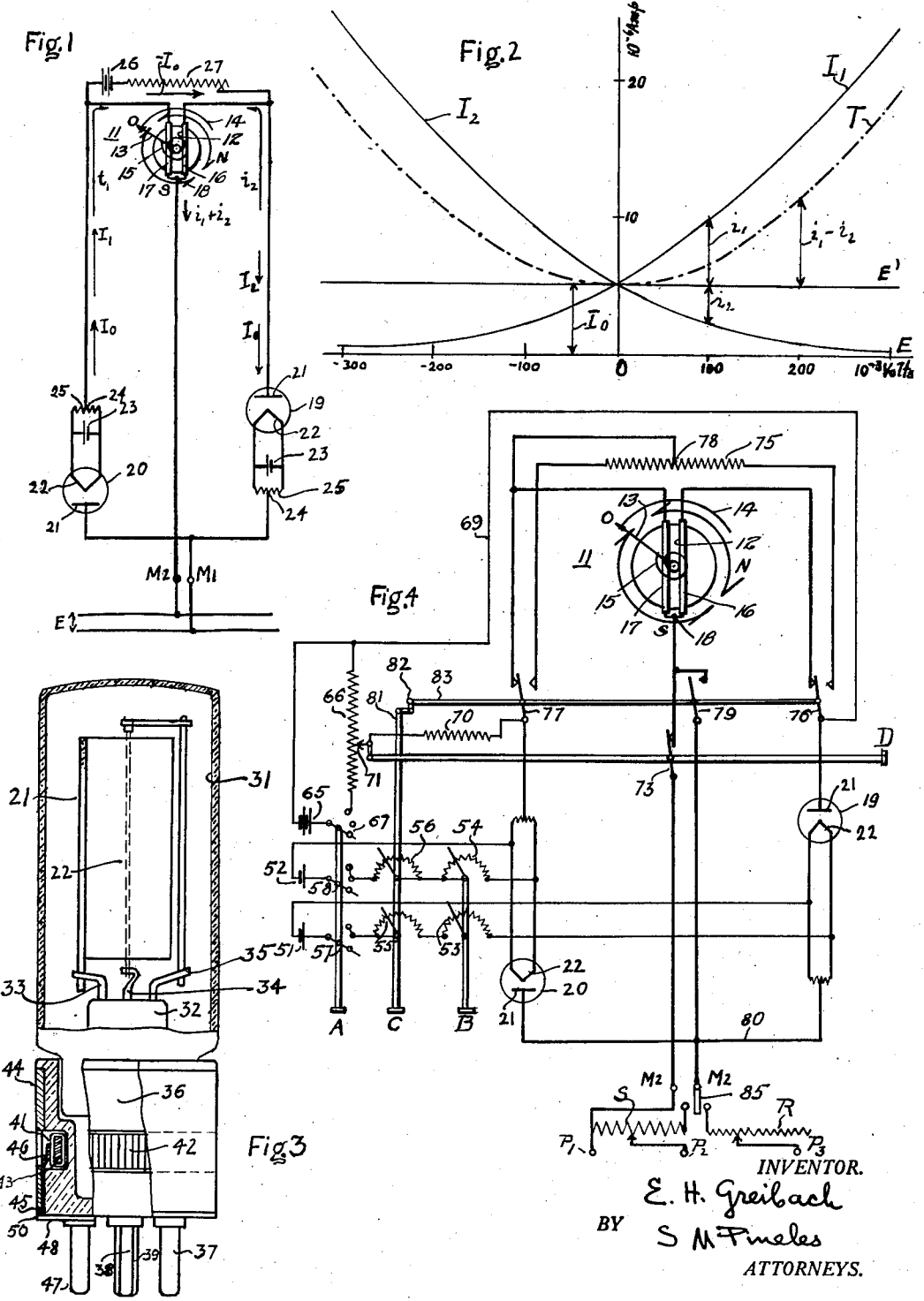

Feb. 12, 1935.  E. H. GREIBACH  1,990,782
ELECTRICAL MEASURING SYSTEM
Filed Nov. 3, 1932   2 Sheets-Sheet 2

INVENTOR.
E. H. Greibach
BY S. M. Pineles
ATTORNEYS.

Patented Feb. 12, 1935

1,990,782

UNITED STATES PATENT OFFICE 1,990,782

ELECTRICAL MEASURING SYSTEM

Emil Henry Greibach, Brooklyn, N. Y.

Application November 3, 1932, Serial No. 640,983

16 Claims. (Cl. 171—95)

This invention relates to electrical measuring systems, and it has among its objects the provision of a novel system, apparatus, and methods for measuring alternating currents and voltages in a simple, yet accurate way, and with great sensitivity.

The features and objects of the invention will be best understood from the following description of exemplifications thereof, reference being had to the accompanying drawings, wherein Fig. 1 is a simplified diagram illustrating a measuring system of the invention;

Fig. 2 is an explanatory curve diagram;

Fig. 3 is an elevational view partly sectional, of a thermionic discharge tube utilized in the measuring system;

Fig. 4 is a diagram of a complete practical meter embodying the invention; and

Figure 6:
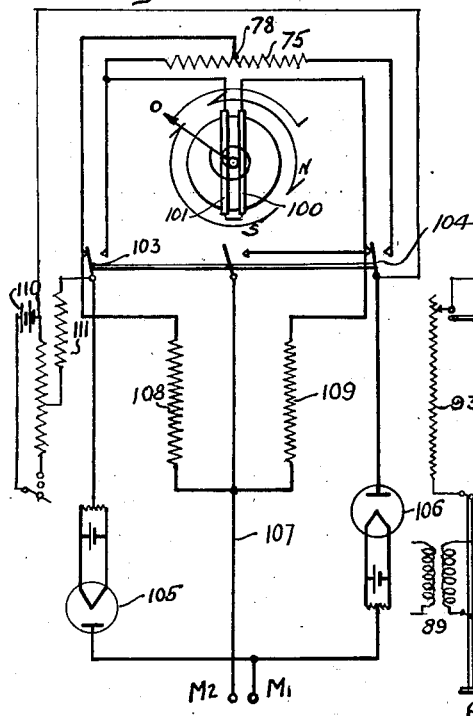
Figs. 5, 6 and 7 are diagrammatic views of meters embodying modified forms of the invention.

For many years past there have been available, and in wide use, sensitive and accurate meters using the simple D'Arsonval movement for measuring direct currents down to values of a fraction of a microampere, and direct-current voltages down to a value of a millivolt or less. The D'Arsonval movement consists of a light coil mounted rotatably in a strong permanent magnetic field, a minute direct current flowing through the coil being sufficient to develop enough torque for deflecting the coil and operate a pointer indicating the magnitude of the current, or of the applied voltage. However, heretofore, there was not available an instrument of like sensitiveness, accuracy and simplicity for measuring alternating currents and voltages.

Because of these difficulties, a type of meter altogether different from the direct-current meter, namely the thermocouple meter, came into use for measurement of alternating currents and voltages, and such meters are at present the only accurate instruments generally used for such measurements. The sensitivity of thermocouple meters is, however, much lower than that of the direct-current meters, and their use causes much trouble because they are extremely delicate, and burn out or lose the calibration, in case of surges or small overloads. There exists, therefore, a demand for a sensitive alternating-current meter similar to the available direct-current meters, capable of measuring very low alternating currents and voltages with a high degree of accuracy. Efforts have been made in recent years to satisfy this demand by three-electrode tube meters, but with only very limited effect due to the low accuracy of such meters.

I have found that an accurate and highly sensitive meter operating with a D'Arsonval movement, and having substantially the same characteristics as the sensitive direct-current meters, may be obtained by actuating the coil of such movement with unidirectional current supplied in a special way by means of electronic discharge valves.

To obtain with a meter having a D'Arsonval movement indications corresponding to the root mean square value of a given alternating current voltage, the coil of the movement must be traversed by a unidirectional energizing current proportional to the squares of the instantaneous values of the alternating current voltage that is to be measured.

High sensitivity of the meter is obtained by using a movement that gives full scale deflection at very small voltages or currents applied to the coil. Accordingly, a sensitive alternating-current voltmeter using a D'Arsonval movement giving root mean square indications requires that the movement coil be energized from a very low voltage source with a very small unidirectional current proportional to the squares of the instantaneous values of the alternating current voltage that is to be measured.

I have found that electron discharge tubes, of the type comprising an anode and a thermionic cathode enclosed in an evacuated tube, herein termed "diodes", have at subnormal cathode temperatures and low anode voltages current-voltage characteristics which can be combined to produce from an applied low alternating current voltage a resultant small unidirectional current which is a quadratic function of the voltage as required for the construction of a sensitive alternating-current meter with a D'Arsonval movement.

In a vacuum tube having a cold anode and a thermionic cathode heated to a temperature of emission, the electron current increases from very low values at a negative anode potential to gradually higher values as the anode potential is increased, the current being a function of the voltage. If a small variable voltage E is applied to such tube, the function of the current I may be resolved into a MacLaurin series giving $$I_1 = F(E) = f(0) + f'(0)E + \frac{1}{2}f''(0)E^2 +$$

$$\frac{1}{3!}f'''(0)E^3 + \frac{1}{4!}f^{IV}(0)E^4 + \quad (1)$$

where $f(0)$ is the value of the current $I_1$ flowing at zero external anode voltage (E=0), and the other members are functions of increasing powers of the voltage E.

If a negative voltage (—E) is applied to such tube, a current $I_2$ will be obtained $$I_2 = F(-E) = f(0) - f'(0)E + \frac{1}{2}f''(0)E^2 - \frac{1}{3!}f'''(0)E^3$$
$$+ \frac{1}{4!}f(0)E^4 - \quad (2)$$

If two such currents are sent through two coil halves of a D'Arsonval movement, the resultant torque T imparted to the movement will be proportional to the sum of the torques of the two currents in accordance with equation $$T = CI_1 + CI_2 = C2f(0) + f''(0)E^2 + \frac{2}{4!}f^{IV}(0)E^4 + \quad (3)$$

wherein C is a constant factor.

Thermionic cathode tubes used as radio tubes and rectifiers operate normally with a relatively high cathode temperature and their current-voltage characteristics contain terms of the fourth power of a value too large to be neglected. However, I have found that in most of the commercial radio tubes, the terms of the fourth and higher power may be reduced to negligible value over a substantial voltage range near the region of zero anode voltage by sufficiently reducing the temperature of the cathode to a lower temperature.

With the temperature of the cathode at such low temperature, the fourth and higher power terms of Equation (3) become negligible, and the value of the torque is then given by $$T = C2f(0) + f''(0)E^2 = T_0 + KE^2 \quad (4)$$

The term $T_0 = CI$ is the torque exercised by the emission current at zero anode potential (E=0), and $KE^2$ is the additional torque produced by the combined flow of the currents $I_1$ and $I_2$ through the two coil halves, being a function of the square of the impressed voltage E irrespective whether the impressed voltage is that of a direct current or an alternating current.

In accordance with the invention, electron discharge tubes operating in the way described above serve as valves to obtain from the voltage source to be measured, whether it is direct current or alternating current, and irrespective of its wave form, a unidirectional current which when applied for energization of a coil of a D'Arsonval movement will produce deflections corresponding to the mean square of the voltage of the source. A meter embodying such arrangement is shown in the simplified diagram of Fig. 1.

The meter comprises a D'Arsonval movement 11 having an actuating coil 12 pivoted for rotary movement in a strong permanent magnetic field induced by permanent magnets, indicated in the drawings by poles N and S, the coil having a number of windings and carrying a pointer 13 to indicate its deflection on a scale 14, and being restrained to the zero position by a spring 15. The coil is divided into two equal halves 16 and 17 and has its midpoint 18 connected to one meter terminal M2, the other meter terminal M1 being connected through two oppositely arranged electron discharge devices 19 and 20 to the ends of the coil halves 16 and 17. The spring 15 opposes the deflection of the coil by a force proportional to the deflection.

The discharge devices are in the form of small evacuated glass tubes and have each an anode 21 and an electron emitting cathode 22. The cathode may, for instance, be of the thermionic type and arranged as a filament heated by batteries 23 to a temperature of thermionic emission at which a quantity of electrons is driven out of the cathode even if the anode is at zero or negative potential against the cathode. The connection of the filamentary cathodes to the circuit is effected by connecting the circuit conductors to taps 24 on potentiometer resistors 25 connected between the filament leads of each tube. In a meter actually built in accordance with the invention, standard radio vacuum tubes, known in the trade as "230" tubes, have been used as the electron discharge devices, these tubes having a tubular anode with an interior filamentary cathode designed to normally operate in radio sets with a filament current of 60 milliamperes, and a grid which was connected to the anode to decrease the impedance of the tube when used in the meter.

In a circuit arrangement as shown in Fig. 1, with the tubes 19 and 20 having their filaments in proper heated condition, thermionic emission will take place from the hot cathodes in the two tubes and a small current will flow in the closed circuit formed by the two tubes 19 and 20 and the coil 12 even if no external voltage is applied to the tubes. If the two tubes are properly adjusted and operate with substantially the same emission, the emission of the two tubes will be exactly alike, its value being designated as $I_0$. This current passing through the coil 11 of the movement will impart to the two coil halves 16 and 17 a torque proportional to the current flow $T = CI_0$, although no voltage source is applied to the two meter terminals M1 and M2.

If now, a small voltage E is applied to the two terminals M1 and M2, with positive voltage applied to M1, additional currents are superimposed on the coil circuits. One current $i_1$ flows from terminal M1 through tube 20 and coil half 17 to terminal M2, thus increasing by its amount the emission current $I_0$ flowing through coil half 17, making the coil current $I_1 = I_0 + i_1$. The other current $i_2$ flows from terminal M1 through tube 19 and coil half 16 to terminal M2, thus decreasing by its amount the current $I_0$ flowing through coil half 16 to $I_2 = I_0 - i_2$. The resulting torque produced by the two currents $I_1$ and $I_2$ flowing through the two coil halves is then given by $$T = CI_1 + CI_2 = C(I_0 + i_1) - C(I_0 - i_2) =$$
$$T_0 + C(i_1 - i_2) = T_0 + KE^2 \quad (5)$$

because in accordance with Equation (4) the resultant of two such currents induced by an external voltage E is $C(i_1 - i_2) = KE^2$.

The net torque increase over the initial emission torque $T_0$ is thus proportional to the square of the applied voltage so that this increase by itself is a measure of the root mean square value of the applied voltage E irrespective of the character of the voltage.

The deflection due to the initial torque $T_0$ may be suppressed by turning the coil spring 15 back till the pointer comes to zero, in which case the deflection of the pointer would be proportional to the mean square of the voltage and give direct indications of the root mean square of the applied voltage.

The initial torque $T_0$ may also be suppressed by connecting a source of current, such as a battery 26, through a rheostat 27 across the coil 12 to send a current $-I_0$ through the coil 12 in a direction opposite to the emission current $I_0$, as shown in Fig. 1.

The action of the current flowing in the two coil halves is well illustrated by the curves in the diagram of Fig. 2, which represent the actual characteristics of radiotron tubes No. 230 used by me in a practical meter of the invention. $I_1$ shows the current emission of a tube as a function of the anode voltage E when the voltage applied to the anode is positive, and $I_2$, which is identical in shape with curve $I_1$, shows the current emission of the tube as a function of the anode voltage E when the voltage applied to the anode is negative. At zero anode voltage, the two curves intersect along the I-axis, the ordinate of the point of intersection representing the emission current of the two tubes when the anode voltage is zero. As arranged in the drawings the ordinates of the two curves $I_1$ and $I_2$ represent the currents flowing through the two coil halves. The ordinates of curves $I_1$ and $I_2$ drawn from a horizontal axis E' at the intersection point of the curves, represent the currents $i_1$ and $i_2$, respectively, produced by the external voltage E, and curve T plotted from the E'-axis by subtracting $i_2$ from $i_1$ represents the magnitude of the torque of the coil for different voltages. This curve has the shape of a parabola. A D'Arsonval movement constructed to give a full scale deflection at about 10 microamperes flowing through one-half of the actuating coil will operate as a very sensitive voltmeter when used as described above.

Where the cathodes of the two tubes are in the form of filaments, there is a voltage drop along the filament, one filament end being negative and the other filament end being positive. For small voltages applied between the anode and the negative end of the filament, the current-voltage characteristics $I_1$, $I_2$ will be continuous curves as shown in Fig. 2, and give a resultant parabolic torque curve T. If the anode voltage is raised above the potential of the positive end of the filament, the character of the emission changes and follows a different law, so that accurate meters must avoid working over a range including this discontinuity. For sensitive operation, meters with filamentary cathodes must have their operating range limited to voltages smaller than the voltage drop across the filament.

Assuming that the coil halves of this movement are connected in a circuit arrangement as are connected in a circuit arrangement as shown in Fig. 1, with standard "230" thermionic tubes, the instrument will give a full deflection when an alternating current or direct current voltage of about 250 millivolts is applied to the terminals M1 and M2 of the meter. As seen from the curves in Fig 2, the emission current $I_0$ of the tubes is about 5 microamperes, and is eliminated during measurements by the compensating current from battery 26 which is equal and opposite. At full deflection, the current $i_1$ in the positive branch of the circuit of tube 20 is about 15 microamperes, while the current $i_2$ through the other branch of tube 19 is about 5 microamperes. The resultant effect of these two currents is equivalent to that of 10 microamperes flowing through each half of the coil 12, producing the torque giving full scale deflection. The sum of the two currents $i_1+i_2$ is the total current flowing from M1 to M2 through the meter circuit, and is equal to about 20 microamperes. Since the voltage of 250 millivolts applied to the terminals produces this current, the meter resistance is equal to about 12,500 ohms, giving a sensitivity corresponding to 50,000 ohms per volt.

Instead of using commercial radio tubes for the meter, special tubes having characteristic current voltage curves that on superposition give parabolic resultants may be constructed to increase the sensitivity of the meter. Such tubes may be constructed to have about one-quarter of the impedance of the "230" tubes at the proper cathode temperature, thereby enabling the use of a voltage of less than 100 millivolts for actuating the movement to full scale deflection. The sensitivity of the meter can also be increased by using a D'Arsonval movement giving full scale deflection for 1 microampere current through the coil, thus requiring less voltage for producing the full deflection current, and enabling measurement of voltages of several millivolts at full scale. In this way the internal meter resistance may be increased to values of one-half megohm per volt or more.

It is important for the operation of the meter that the two tubes 19 and 20, in the two branches of the coil 12, are connected so that the emission currents $I_0$ flow in the same direction in the circuit connecting said tubes in series, and that the two tubes shall have substantially the same current voltage characteristics over the range used in the meter. Ordinary commercial radio tubes differ considerably in their characteristics and ordinarily cannot be used in the condition in which they are bought. I have found that the characteristics of such commercial electron tubes may be readily changed and brought into conformity so as to work properly in the meter, in the way described above. By regulating the temperature of the cathode, for instance, varying with a resistor the current supplied to the filament, the emission of the tube may be varied and the impedance of the tube adjusted. Adjustment of the tube characteristics is also possible by varying the effective potential between the anode and the cathode of the tube through the provision of a potentiometer resistance connected across the filament and varying the tap connection to the potentiometer. Bringing the tap on the filament potentiometer closer to the positive end increases the effective anode potential against the cathode, reducing the tube impedance and increasing the emission.

In adjusting a pair of tubes for use in the meter, the emission of the tubes under similar voltage conditions, and particularly at zero external anode voltage, is first investigated and the cathodes of the two tubes are brought to a temperature at which both tubes have the same emission at such potential. Thereupon, the slopes of the characteristic curves of the two tubes are brought into substantial conformity by shifting the potentiometer tap on the tubes, while varying the rheostat controlling the heating current in opposite sense to keep the emission unchanged. Increasing of the filament temperature, while decreasing the potential difference while keeping the emission current $I_0$ constant, will increase the slope and decrease the impedance of the current-voltage curve of the tube; and decreasing the temperature, while increasing the potential difference under such conditions, will tend to decrease the slope and increase the impedance. It is thus possible to adjust both tubes to have substantially the same current-voltage curves within the range of the voltages and currents with which they are required to operate in the meter. Once a suitable potentiometer tap point is determined, it may be permanently left in place and subsequent adjustments confined to adjusting the cathode temperature of both tubes to a given value of emission at zero external anode voltage.

Adjustment similar to that obtained with the potential regulation can also be obtained by adding a series of resistance to the tube having the smaller internal impedance, while having the filaments of both tubes adjusted to give equal emission. By proceeding in the ways described above, most of the available radio tubes can be adjusted to function in the arrangement of the meter.

The potentiometers for adjusting the effective tube potential may be connected in the meter circuit across the leads to the cathode filaments. However, to facilitate the replacement of the tubes and to avoid tampering with the permanent wiring of the meter, I prefer to construct the tubes used in the meter so that they are each provided with their own potentiometer tapped at a point to give the current voltage characteristic of the tube a standard shape at a standard emission.

Such tube is shown in Fig. 3 of the drawings and comprises an evacuated glass envelope 31 having a reentrant press 32 provided with three sealed-in lead-in wires 33, 34, 35 leading to the anode 21 and the cathode filament 22, respectively. The tube has secured over its bottom portion a hollow base 36 provided at the bottom with a prong 37 connected to the anode, and two prongs 38 and 39 connected to the lead wires 34 and 35 of the filament serving to supply heating current thereto. The base is further provided with a groove 41 at an intermediate portion of its outer cylindrical surface, and within this groove is mounted a resistor 42 in the form of a thin wire wound on a core 43 and having its ends connected to the lead wires 34 and 35 to form a potentiometer across the filament. The base 36 is provided with an enclosing sleeve 44 fitting over the cylindrical base and is on its lower edge provided with a conducting annular strip 45 having at a point on its inner side an upward strip, the upper end of which is bent into a contact member 46 adapted to rest and make contact with a point of the resistor 42, thus tapping the resistor. The base has also a fourth prong member 47 which has electrical connection with a conducting projection 48 having its outer edge contacting with the underside of the conducting strip 45 on the bottom of the sleeve edge, thereby providing a conducting connection between the prong 47 to the tapping point of the resistor 42.

By this arrangement, it is possible to vary the tap connection to the potentiometer 42 by merely rotating the sleeve on the base. After having once picked out the correct tap connection, the tube is permanently left in this condition by joining strip 45 to the projection 48, for instance, by soldering the abutting ends of the same at 50, and also by soldering the end of the contact strip 46 to its point of contact with the resistor 42.

The foregoing arrangement thus readily permits the adjustment of any desired number of tubes to have substantially identical emission currents at zero anode voltage when used on a predetermined readily adjustable temperature, and to have current voltage characteristics of substantially the same kind within the range required by the meter.

To enable the ready and easy use of the meter, I have provided the practical meter arrangement shown in Fig. 4. Like the arrangement of Fig. 1, the meter comprises the same kind of D'Arsonval movement 11 with two tubes 19 and 20 connected into a meter circuit with meter terminals M1 and M2.

The cathodes 22 of the two tubes are shown supplied from batteries 51 and 52 through sets of rheostats 53, 54, 55 and 56 and switches 57 and 58. If the switches 57 and 58 are closed, the cathode filaments 22 of the two tubes are energized and the amount of current in both tubes therein can be varied by rotating a common actuating handle B of the two rheostats 52 and 54. The two rheostats 55 and 56 are similarly operated by a common handle C, the two rheostats being so connected that when rotating the handle in one direction, for instance, to the right, the resistance in the supply circuit to the cathode of tube 19 is reduced in rheostat 55 and that of the circuit to the cathode of the tube 20 is increased in rheostat 56. It is thus possible to quickly balance any differences in temperature and the emission of the two tubes by simply turning the handle C to the right or to the left until balance of the emission is obtained.

In order to suppress the emission current within the coil 12 of the instrument, and enable direct indication of the applied voltage by the pointer, the meter is provided with a supply of compensating current from the battery 65, the battery having a potentiometer 66 which may be energized by closure of a switch 67 that is actuated together with the filament battery switches 57 and 58 by the common handle A. The switches 57, 58 and 67 are so arranged that when switches 57 and 58 are in the first closed position indicated in the drawings, switch 67 stays open leaving potentiometer 66 de-energized, closing the circuit of the potentiometer only after switches 57 and 58 are moved by handle A to the second closed position. In that position, which is the normal operating position of the meter, a compensating current is applied from the potentiometer 66 through conductor 69 and resistor 70 to the leads from the two tubes 19 and 20 to the ends of the two coil halves 16 and 17, producing a current flow through the coil 12 in a direction opposite to the direction of the emission current $I_0$. This compensating current can be easily adjusted by shifting the tap 71 on the potentiometer 66, the movement of the tap being actuated by a handle D when depressed, in which position handle D also holds open a switch 73 in the lead from the midpoint 18 of the meter coil to the terminal M2, thereby opening the external circuit connection of the coil midpoint and preventing flow of external current over terminals M1 and M2 through the coil 12. Complete compensation is obtained by shifting the tap 71 to a point at which pointer 13 is back at the zero position.

For the proper operation of the tube, it is essential to ascertain before use whether the emission current of the two tubes is at the proper value. This is readily determined with the arrangement of Fig. 4 by bringing by means of handle A the switches 57 and 58 to the first position in which switch 67 is open. The two tubes 19 and 20 are then energized and they send an emission current through coil 12, but no compensating current is flowing through the circuit because switch 67 is open. The pointer 13 of the meter will, therefore, be deflected and its deflection will indicate the magnitude of the emission current. I preferably provide on the meter a special mark, indicated by the numeral $I_0$ on the scale, to which the pointer must point when the emission of the cathode has reached the value required for the operative condition of the tube. If the emission is too low and the pointer is to the left of the mark, the emission can be increased by turning handle B to the right, cutting out resistance from the circuits leading to the two filaments, and if the emission is too high, the pointer may be brought back to the mark by turning handle B to the left, increasing the resistance in the supply circuit of the two cathodes.

In order to enable positive and quick determination whether the two tubes have at the zero external anode voltage equal emissions, there is provided a special balancing resistor 75 which may be connected by means of switches 76 and 77, actuated by handle C through rod 81 and coupling 82 operating through rod 83, to disconnect the meter coil 12 from the tube circuit and substitute instead the resistor 75, the resistor having a resistance equal to the resistance of the coil 12. The resistor 75 is divided at its midpoint 78 in two substantially equal halves. The midpoint 78 is connected to the left end of coil half 17 and therethrough by way of the midpoint 18 of the coil and the switch 79 to conductor 80 completing the tube circuit. With this arrangement, an excess of current in one of the halves of the resistor 75 will immediately manifest itself in the flow of an unbalanced current through the conductor connecting the midpoint 78 and coil half 17 to conductor 80 producing a deflection of the meter. The proper condition of the two thermionic tubes can thus be quickly ascertained by merely depressing handle C which causes switches 76, 77 and 79 to move to the right, substituting the resistor for coil 12 and showing at a glance at the pointer 13 the condition of the tubes. If both emissions are equal, the pointer stays at zero. If the emission of one tube is larger than the other, the pointer 13 is deflected and the emission may be quickly balanced by turning with the handle C the rheostats 55 and 56 either to the right or to the left to reduce the filament current of the tube having greater emission and increase the filament current of the tube having the smaller emission till the two emissions are balanced and the pointer returns to zero. The corresponding portions of the coil 12 and the resistor 75 should have alike resistance.

To set the meter ready for measurements, it is best to proceed as follows:

(1) With the circuit to be measured disconnected from the meter, the handle A is pushed in to the first closed position, energizing the cathode filaments of the two tubes and starting the flow of the emission current through coil 20. As soon as the current has reached a stationary value, the rheostat handle B is turned until the pointer has come into the position indicated by the mark $I_0$, thereby showing the emission to be of the value for which the meter is calibrated.

(2) Thereupon, the equality of the emission of the two tubes 19 and 20 is checked by depressing handle C and bringing switches 77, 79 and 76 to the right hand position, thereby connecting the balancing resistor 75 in circuit with the coil half 17 to indicate any inequalities in the emission of the two tubes; if an inequality exists, it is eliminated by rotation of handle C controlling rheostats 55 and 56 to increase the emission of one tube and decrease the emission of the other tube till balance is established, whereupon, by releasing handle C, switches 77, 79 and 76 are automatically returned to the normal left-side position.

(3) The next step is to compensate the emission current flow through the coil. To this end switch handle A is pushed to the second closed position, applying the potentiometer potential to the coil 12 and sending a compensating current through coil 12. If the current is equal to the emission current, pointer 13 returns from its position at the mark $I_0$ to the zero position. If the current is not completely balanced, the pointer shows a deflection and by pushing down handle D the tap 71 is adjusted along the potentiometer till the pointer returns to zero, the circuit between coil 12 to the terminals M1 and M2 being completely interrupted during this operation by the opening of switch 73 while the tap 71 is shifted. Switch 73 serves the special purpose of disconnecting the external circuit from the meter when checking the zero position during a test.

It is good practice after carrying out the adjustments as indicated above, to again check up the normal emission and the equality of the emission of the two tubes, by repeating the Operations (1) and (2) described above. These operations are easily performed and do not unnecessarily burden the user of the instrument, requiring merely tipping of a switch lever and slight rotation of a rheostat to bring the meter to proper adjustment.

In order to maintain uniform operating conditions, the resistance of the potentiometer 66 is made of a value at which it drains the battery 65 at a rate at which the battery will be used up when the filament batteries 51 and 52 are used up. This arrangement assures that in case the emission current decreases during use because of battery drain, the compensating current likewise becomes reduced by a corresponding amount so that the indications of the meter are not materially affected.

The meter of the invention as shown in Figs. 1 and 4 will measure not only voltage, but is also a very sensitive instrument for measuring alternating current down to very small values. The current I flowing from the source of current through the terminals M1 and M2 into the meter coil 12 is $$I = i_1 + i_2 = I_1 - I_2$$

substituting from (1) and (2) we have $$I = 2f'(0)E + \frac{2}{3!}f'''(0)E^3 + \frac{2}{5!}f^v(0)E^5 + \quad (5)$$

As before, the terms of the fifth power and of all higher powers are negligible and may be disregarded.

This equation indicates that the current has in addition to a term directly proportional to E, also a cubic term which might prevent the coil deflections to indicate root mean square readings of the current. The value of the cubic term depends on the character of the current, whether it is direct current or alternating current, and on its wave form. However, I have found that by making the emission current of the tube cathodes at zero external anode voltage sufficiently large, the factor $$\frac{2}{3!}f'''(0)$$

of the cubic term is very small, so that the term becomes negligible and any errors that might be introduced are less than 1% and practically unobjectionable. Accordingly, the current I is, within practical limits, proportional to the applied voltage E and the deflection of coil are proportional to the root mean square value of the current. Thus the practical meter built by me using a D'Arsonval movement with full deflection at 10 microamperes, and "230" tubes adjusted to emission of 5 microamperes will measure alternating currents with an accuracy within 1%, giving a full scale deflection at about 20 microamperes.

Where still greater accuracy is required, the effect of the cubic term may be reduced still more by using a more sensitive movement, and thus reducing the voltage required at full scale deflection. This is based on the fact that the cubic term decreases very rapidly as the full-scale voltage is reduced. It is for this reason that in operating the meter, referred to above, the readings of the meter up to 60% of the full scale have not been affected by the cubic term.

The accuracy of my meter is substantially the same as that of corresponding precision direct-current meters, and the meters of the invention may be calibrated by comparison with direct current standards.

The meter maintains constant calibration provided that the emission current of the tubes is maintained at the correct value. However, the adjustment of the emission current is not critical, and variations of 10% of the emission current do not change the calibration.

Like standard direct-current meters, the meter of the invention can have its ranges as an ammeter and voltmeter extended by provision of shunts and series resistors, respectively. This is indicated in Fig. 4 by the universal current shunt S and series resistor R. The shunt S as well as the resistor R may be provided with a number of taps by multiplying the ranges. In the drawings, binding post P1, which is connected to meter terminal M2, serves in conjunction with binding post P2 when the meter is used as a current meter, in which case the jumper 85 connects terminal M1 with the end of the current shunt S. When used as a voltmeter, binding post P1 is used in conjunction with binding post P3, with the jumper 85 in right-hand position connecting terminal M1 to the resistor R.

Figure 5:
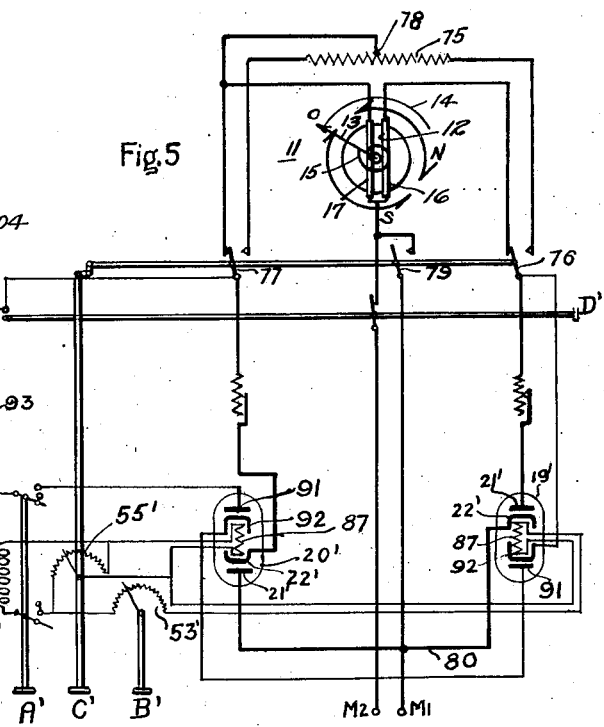

Instead of using batteries for heating the filamentary cathodes of the tubes and for supplying the compensating current, the meter may be arranged for energization by alternating current, taken from a low voltage domestic line, shown in Fig. 5. The meter circuit and elements are arranged exactly as in the meter shown in Fig. 4. It distinguishes over the meter of Fig. 4, by the use of tubes 19' and 20' which have meter cathodes 22' that are indirectly heated by heaters 87 energized through rheostat 53' from a transformer 89 connected to the alternating current lighting circuit. The anodes 21' and the cathodes 22' are connected in the meter coil circuit exactly like the anodes 21 and cathodes 22 of Fig. 4.

The tubes 19' and 20' contain each a second anode 91 and a second cathode 92, the second cathode being heated to thermionic emission by the same heater 87 which heats the first cathode 22'. The second anodes 91 and cathodes 92 of the two tubes 19' and 20' are connected in series like the set of the first anodes and cathodes, to produce a second emission current which is led through adjustable resistor 93 to the leads of coil 12, the second emission current being adjusted to be equal and oppose the flow of the main emission current. The second emission current supplied by the second set of anodes and cathodes takes the place of the compensating current supplied by battery 65 in Fig. 4. Handle B' controls by rheostat 53' the heating current supplied to heaters 87 and enables to adjust the temperature of the cathode 22' to the proper temperature $I_0$ as in Fig. 4. Handle C' serves to control through potentiometer 55' the relative current distribution in the two heaters 87 to enable balancing of the emissions of the two cathodes 22', and it functions otherwise like the handle C in Fig. 4. The surfaces of the second cathodes 92 are constructed to have substantially stronger emission so that they shall be able to supply the compensating current through a substantial resistance 93 to the coil. By this arrangement fluctuations of the heater supply voltage will not affect the operation of the meter because a variation of the emission of one set of cathodes will be accompanied by a like variation of the emission of the other set of cathodes.

The principles underlying the high sensitivity meter described in connection with Figs. 1 and 4, namely the use of special electron discharge devices for converting applied currents in accordance with special current-voltage characteristics and applying such combined currents for actuating special devices, may have many other applications that will suggest themselves to those skilled in the art.

In Fig. 6 is shown a voltmeter embodying a modification of the invention. Like the meter in Fig. 4, it comprises a D'Arsonval movement 100 having a coil 101 arranged to move in a magnetic field produced by magnets N and S and provided with a pointer and restraining spring. The ends of the coil are connected over switches 103 and 104 and through two thermionic electron tubes 105 and 106 to meter terminal M1, the second meter terminal M2 being likewise connected through conductor 107 and two resistors 108 and 109 to the two ends of coil 101. The arrangement is thus similar to that of Fig. 4, except that instead of the connection of the terminal M2 to the midpoint of the coil 101, no connection to the midpoint is made, but two resistors 108 and 109 are connected to the ends of the meter coil 101, thus forming a bridge. If the two tubes 105 and 106 are turned on, and adjusted in the way described in connection with Figs. 1 and 4, there will flow an emission current $I_0$ through the closed circuit including tube 105, coil 101, tube 106, and the connecting conductors to tube 105. The flow of this emission current through the meter coil is suppressed during the operation of the meter by means of an auxiliary battery 110 and potentiometer 111 leading to the ends of coil 101 like in Fig. 4. If the excitation currents of the tubes 105 and 106 are equal, a voltage applied to the terminals M1 and M2 will result in a flow of a composite current through the coil 100 proportional to the square of the applied voltage, producing a deflection of the pointer indicating the root mean square value of the applied voltage.

Figure 7:
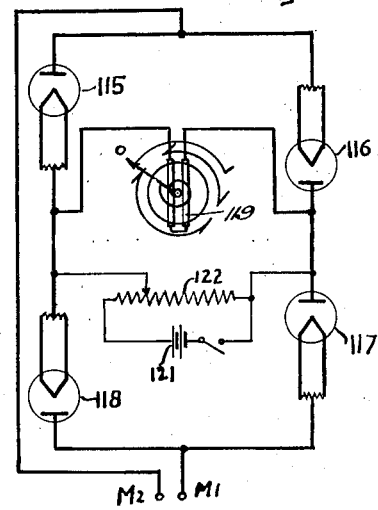

In Fig. 7 is shown a further modification of the invention in which four thermionic electron tubes 115, 116, 117 and 118 are connected in a series bridge circuit. The actuating coil 119 of an instrument, such as the D'Arsonval movement, is connected to one set of diagonal points on the bridge, and the meter terminals M1 and M2 are connected to the other set of diagonal points on the bridge. Each pair of tubes lying on one side of the coil 119 will produce an emission current going by way of coil 119, and this emission current can be suppressed during the operation of the meter by means of an auxiliary compensating source 121 and potentiometer connections thereto 122, as in the previous arrangements. The bridge arrangement of Fig. 6 operating with electron discharge tubes adjusted as explained in connection with Figs. 1 and 4 will, upon application of a voltage to the terminals M1 and M2, produce a unidirectional current flow through coil 19 proportional to the square of the voltage applied to the terminals M1 and M2, thus imparting to the coil a torque which will enable the pointer to indicate directly the root mean square value of the applied voltage.

The broad features of the invention are not limited to any special discharge devices nor to any details of construction, arrangements and method of operation referred to in describing the practical exemplifications thereof, as many modifications thereof will suggest themselves to those skilled in the art. It is accordingly desired that the appended claims be given a broad construction commensurate with the scope of the invention.

I claim:

1. In a measuring system, a pair of terminals, a measuring device having an actuating winding producing measurements in accordance with the magnitude of the force exercised by current flowing through said winding, and electron discharge valve means connected in series with said winding across said terminals and constituting therewith an impedance causing flow of current to be measured through said winding producing measurements substantially proportional to the square of the voltage applied to said terminals or to the square of the current flowing between the terminals.

2. In a measuring system, a measuring device having an actuating winding producing measurements in accordance with the magnitude of the force exercised by current flowing through said winding, and electron discharge valve means connected in series with said winding and constituting therewith an impedance causing flow of current through said winding producing at voltages of less than 1 volt applied to said impedance measurements substantially proportional to the square of the applied voltage or to the square of the current flowing through said impedance.

3. In a measuring system, a pair of terminals, a measuring device having means for producing a permanent unidirectional magnetic field and windings mounted to be moved in said field and produce measurements under the action of said field in accordance with current flowing in said windings, and a plurality of thermionically emitting valves connected in series with said windings across said terminals and constituting therewith an impedance causing flow of currents to be measured through said valves and windings upon application of a voltage to said terminals, said valves having current-voltage characteristics at which the resultant flow of current to be measured in said windings produces a measuring force substantially proportional to the square of the voltage applied to said terminals.

4. In a measuring system, a measuring device having means for producing a permanent unidirectional magnetic field and windings mounted to be moved in said field and produce measurements under the action of said field in accordance with current flowing in said windings, and a plurality of discharge valves connected to said winding and constituting therewith an impedance causing flow of currents through said valves and windings upon application of a voltage to said impedance, said valves comprising each, an evacuated envelope, an anode, and a thermionic cathode, and having current-voltage characteristics within the range of voltages less than 1 volt at which the resultant current flow in said windings produces a measuring force substantially proportional to the square of the applied voltage or of the current flowing through the impedance.

5. A meter comprising a measuring device having means for producing a permanent unidirectional magnetic field and a winding mounted to be moved in said field and indicate measurements under the action of said field in accordance with current flowing in said winding, a pair of terminals, a first unidirectionally conducting discharge valve connected in series with one half of said winding between said terminals to pass currents of one polarity, and a second unidirectionally conducting discharge valve connected in series with the other half of said winding between said terminals to pass currents of a polarity opposite to the currents passed by said first valve, the currents flowing through said winding halves exercising forces acting in the same direction and producing measurements, said valves having current-voltage characteristics within the range of voltages less than 1 volt at which the resultant current flow in said winding produces a measuring force substantially proportional to the square of the applied voltage or of the current flowing through the impedance.

6. A meter comprising a measuring device having means for producing a permanent unidirectional magnetic field and a winding mounted to be moved in said field and indicate measurements under the action of said field in accordance with current flowing in said winding, a pair of terminals, a first unidirectionally conducting discharge valve connected in series with one half of said winding between said terminals to pass currents of one polarity, and a second unidirectionally conducting discharge valve connected in series with the other half of said winding between said terminals to pass currents of a polarity opposite to the currents passed by said first valve, the currents flowing through said winding halves exercising forces acting in the same direction and producing measurements, said valves comprising each, an evacuated envelope, an anode, and a thermionic cathode, and having current-voltage characteristics within the range of voltages less than 1 volt at which the resultant current flow in said windings produces a measuring force substantially proportional to the square of the applied voltage or of the current flowing through the impedance.

7. In a measuring system, a measuring device having means for producing a permanent unidirectional magnetic field and a winding mounted to be moved in said field and produce measurements under the action of said field in accordance with current flowing in said winding, a pair of terminals, a first discharge valve connected in series with a portion of said winding between said terminals, a second discharge valve connected in series with a portion of said winding between said terminals, said valves comprising each an evacuated envelope, an anode, and a thermionic cathode producing during operation internal emission currents through a portion of the winding while no external current flows through said terminals, and means for compensating the effect of said internal current on the measurements effected by current flow through said winding, the circuits through said valves having impedance characteristics at which an external voltage applied to said terminals passes through said winding currents exercising forces producing measurements proportional to the square of the applied voltage.

8. In a measuring system, a measuring device having means for producing a permanent unidirectional magnetic field and a winding mounted to be moved in said field and produce measurements under the action of said field in accordance with current flowing in said winding, a pair of terminals, a pair of discharge valves, and switching means establishing in a first position circuits connecting each of said discharge valves in series with a portion of said winding between said terminals, said valves comprising each an evacuated envelope, an anode, and a thermionic cathode producing during operation internal emission currents through a portion of the winding while no external current flows through said terminals, the circuits through said valves established in said first position having impedance characteristics at which an external voltage applied to said terminals passes through said winding currents exercising forces producing measurements proportional to the square of the applied voltage, said switching means having an alternative second position connecting said valves and said winding into a closed circuit energizing said winding to indicate inequality of internal emission of said valves.

9. In a measuring system, a measuring device having means for producing a permanent unidirectional magnetic field and a winding mounted to be moved in said field and produce measurements under the action of said field in accordance with current flowing in said winding, a pair of terminals, a pair of discharge valves, switching means establishing in a first position circuits connecting each of said discharge valves in series with a portion of said winding between said terminals, said valves comprising each an evacuated envelope, an anode, and a thermionic cathode producing during operation internal emission currents through a portion of the winding while no external current flows through said terminals, and means for compensating the effect of said internal current on the measurements effected by current flow through said winding, the circuits through said valves established in said first position having impedance characteristics at which an external voltage applied to said terminals passes through said winding currents exercising forces producing measurements proportional to the square of the applied voltage, said switching means having an alternative second position connecting said valves and said winding into a closed circuit energizing said winding to indicate inequality of internal emission of said valves.

10. An electric meter comprising a pair of terminals, a measuring device having means for producing a permanent unidirectional magnetic field and windings mounted to be moved in said field and produce measurements under the action of said field in accordance with current flowing in said windings, a plurality of discharge valves having each an anode and a thermionically emitting cathode filament connected to said windings and constituting therewith between said terminals an impedance causing flow of currents through said valves and windings upon application of a voltage less than the filament voltage to said terminals, said valves having current-voltage characteristics within the range of voltages less than the filament voltage at which the resultant current flow in said windings produces a measuring force substantially proportional to the square of the applied voltage or of the current flowing through the impedance.

11. A meter comprising a measuring device having means for producing a permanent unidirectional magnetic field and a pair of windings mounted to be moved in said field and indicate measurements under the action of said field in accordance with current flowing in said windings, a pair of terminals, a first unidirectionally conducting discharge valve connected in series with one half of said winding between said terminals to pass currents of one polarity, and a second unidirectionally conducting discharge valve connected in series with the other half of said winding between said terminals to pass currents of a polarity opposite to the currents passed by said first valve, the currents flowing through said winding halves exercising forces acting in the same direction and producing measurements, said valves having thermionic cathodes and current-voltage characteristics within the range of currents of less than 10 milliamperes at which the resultant current flow in said winding produces a measuring force substantially proportional to the square of the applied voltage or of the current flowing through the impedance.

12. A meter comprising a measuring device having means for producing a permanent unidirectional magnetic field and a pair of windings mounted to be moved in said field and indicate measurements under the action of said field in accordance with current flowing in said windings, a pair of terminals, a first unidirectionally conducting discharge valve connected in series with one half of said windings between said terminals to pass currents of one polarity, and a second unidirectionally conducting discharge valve connected in series with the other half of said windings between said terminals to pass currents of a polarity opposite to the currents passed by said first valve, the currents flowing through said winding halves exercising forces acting in the same direction and producing measurements, said valves having thermionic cathodes and current-voltage characteristics within the range of currents of less than 10 milliamperes at which the resultant current flow in said windings produces a measuring force substantially proportional to the square of the applied voltage or of the current flowing through the impedance.

13. An electric meter comprising a pair of terminals, a measuring device having means for producing a permanent unidirectional magnetic field and windings mounted to be moved in said field and produce measurements under the action of said field in accordance with current flowing in said windings, a plurality of discharge valves having an initial current flow therethrough at zero external voltage and connected to said windings between said terminals to constitute therewith impedance means causing flow of currents to be measured through said valves and windings upon application of a voltage to said terminals, said valves having current-voltage characteristics at which the resultant flow of current to be measured in said windings produces a measuring force substantially proportional to the square of the voltage applied to said terminals.

14. An electric meter comprising a pair of terminals, a measuring device having means for producing a permanent unidirectional magnetic field and windings mounted to be moved in said field and produce measurements under the action of said field in accordance with current flowing in said windings, and a pair of discharge valves having an initial current flow therethrough at zero external voltage and connected in series with different portions of said windings across said terminals, said valves having current-voltage characteristics at which upon application of a voltage to said terminals currents of opposite magnetic effect will flow through said windings producing a resultant measuring force substantially proportional to the square of said voltage.

15. An electric meter comprising a pair of terminals, a measuring device having means for producing a permanent unidirectional magnetic field and windings mounted to be moved in said field and produce measurements under the action of said field in accordance with current flowing in said windings, and a pair of thermionic discharge valves having a thermionically emitting cathode and an anode and connected in series with different portions of said windings across said terminals, said valves having current-voltage characteristics at which upon application of a voltage to said terminals currents of opposite magnetic effect will flow through said windings producing a resultant measuring force substantially proportional to the square of said voltage.

16. An electric meter comprising a plurality of terminals, a measuring device having means for producing a permanent unidirectional magnetic field and windings mounted to be moved in said field and produce measurements under the action of said field in accordance with current flowing in said windings, and a pair of discharge valves having an initial current flow therethrough at zero external voltage and connected in series with said windings across said terminals, each of said valves having current-voltage characteristics at which upon application of an alternating voltage to said terminals currents of opposite magnetic effect will flow through said windings producing in conjunction with the associated other valves a resultant measuring force substantially proportional to the square of said voltage.

EMIL H. GREIBACH.